United States Patent
Wang

(10) Patent No.: US 8,155,847 B2
(45) Date of Patent: Apr. 10, 2012

(54) ELECTRONIC TRANSMISSION SHIFTING ARCHITECTURE WITH MAXIMIZED AVAILABILITY

(75) Inventor: Orson S. Wang, Livonia, MI (US)

(73) Assignee: GM Global Technology Operations LLC

( * ) Notice: Subject to any disclaimer, the term of this patent is extended or adjusted under 35 U.S.C. 154(b) by 786 days.

(21) Appl. No.: 12/178,870

(22) Filed: Jul. 24, 2008

(65) Prior Publication Data

US 2009/0298645 A1 Dec. 3, 2009

Related U.S. Application Data

(60) Provisional application No. 61/058,315, filed on Jun. 3, 2008.

(51) Int. Cl.
*G06F 17/00* (2006.01)
(52) U.S. Cl. ............................... 701/54; 701/62; 477/111
(58) Field of Classification Search ............... 701/48, 701/51, 54, 62, 123; 477/5, 96, 127
See application file for complete search history.

(56) References Cited

U.S. PATENT DOCUMENTS

| | | | | |
|---|---|---|---|---|
| 5,908,460 A * | 6/1999 | Amisano et al. | ................ | 701/51 |
| 5,974,351 A * | 10/1999 | Croft et al. | ....................... | 701/48 |
| 6,151,978 A * | 11/2000 | Huber | .......................... | 74/336 R |
| 6,196,078 B1 * | 3/2001 | DeJonge et al. | ........... | 74/473.12 |
| 7,301,478 B1 * | 11/2007 | Chinn et al. | .................. | 340/905 |
| 7,490,528 B2 * | 2/2009 | Koski et al. | ................. | 74/336 R |
| 2004/0249541 A1 * | 12/2004 | Kim | ............................... | 701/51 |
| 2007/0191182 A1 * | 8/2007 | Koski et al. | ..................... | 477/96 |
| 2008/0064559 A1 * | 3/2008 | Cawthorne et al. | ............... | 477/5 |
| 2009/0233765 A1 * | 9/2009 | Tao et al. | ...................... | 477/127 |

* cited by examiner

*Primary Examiner* — Thomas Black
*Assistant Examiner* — Shardul Patel

(57) ABSTRACT

A system comprises a shifter module, an engine control module, and a transmission control module. The shifter module generates a position signal based on a position of a driver input. The engine control module controls an engine, selects one of a plurality of transmission gear ranges based on a mapping of the position signal to the plurality of transmission gear ranges, and generates a range request signal based on the selected transmission gear range. The transmission control module controls a transmission based on the range request signal.

18 Claims, 3 Drawing Sheets

ELECTRONIC TRANSMISSION SHIFTING ARCHITECTURE WITH MAXIMIZED AVAILABILITY

CROSS-REFERENCE TO RELATED APPLICATIONS

This application claims the benefit of U.S. Provisional Application No. 61/058,315, filed on Jun. 3, 2008. The disclosure of the above application is incorporated herein by reference.

FIELD

The present disclosure relates to electronic transmission control and more particularly to range selection.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIG. 1, a functional block diagram of electronic transmission range selection is presented. Range selection is the act of selecting a gear range such as park, reverse, neutral, drive, low, or overdrive in a vehicle 100. The vehicle 100 includes a shifter module 112. The shifter module 112 is used by a driver to select a range.

The shifter module 112 may determine the position of a driver input by using sensors. The driver input may include, for example, a lever, button, or paddle. Readings from the sensors may be transmitted to a shifter interpretation module (SIM) 110. The SIM 110 may then interpret the sensor readings, determine which range the driver has selected, and transmit a range request to an engine control module (ECM) 104 and a transmission control module (TCM) 106.

The engine control module 104 controls an engine 102. The engine control module 104 may use data from the engine 102 to control components of the vehicle 100. The TCM 106 may receive the range request in different ways. For example, the TCM 106 may receive the range request by direct connection or via a network. The TCM 106 uses the range request to control a transmission 108.

SUMMARY

A system includes a shifter module, an engine control module, and a transmission control module. The shifter module generates a position signal based on a position of a driver input. The engine control module controls an engine, selects one of a plurality of transmission gear ranges based on a mapping of the position signal to the plurality of transmission gear ranges, and generates a range request signal based on the selected transmission gear range. The transmission control module controls a transmission based on the range request signal.

In further features, the driver input includes a lever, and the position signal is based on a position of said lever. In still further features, the position of the lever is based on an angle of the lever. In other features, the shifter module comprises a driver input, a sensor, an encoding module, and a transmitting module. The sensor generates a first signal based on the position of the driver input. The encoding module encodes the first signal to generate the position signal. The transmitting module transmits the position signal to the engine control module.

In still other features, the engine control module comprises a receiving module, a decoding module, and an interpretation module. The receiving module receives the position signal. The decoding module decodes the received position signal. The interpretation module selects the selected transmission gear range and generates the range request signal. In other features, the engine control module controls the transmission when the transmission control module is malfunctioning.

In still other features, the system further comprises a backup transmission control module that controls the transmission when the transmission control module is malfunctioning. In other features, the engine control module generates a status signal based on the range request signal and a status of the transmission control module. In further features, the system further comprises a driver information center that selectively produces at least one of a visual indicator and an auditory indicator based on the status signal.

A method comprises generating a position signal using a shifter module based on a position of a driver input; controlling an engine using an engine control module; selecting one of a plurality of transmission gear ranges using the engine control module based on a mapping of the position signal to the plurality of transmission gear ranges; generating a range request signal using the engine control module based on the selected transmission gear range; and controlling a transmission based on the range request signal.

In further features, the driver input includes a lever, and the position signal is based on a position of the lever. In still further features, the position of the lever is based on an angle of the lever. In other features, the method further comprises generating a first signal using the shifter module based on the position of the driver input; encoding the first signal using the shifter module; generating the position signal using the shifter module based on the encoding; and transmitting the position signal to the engine control module.

In still other features, the method further comprises receiving the position signal using the engine control module; decoding the received position signal using the engine control module; and selecting the selected transmission gear range using the engine control module based on the decoding. In other features, the method further comprises controlling the transmission using the engine control module based on a status of a transmission control module. In further features, the method further comprises controlling the transmission using the engine control module when the transmission control module is malfunctioning.

In other features, the method further comprises controlling the transmission using a backup transmission control module based on a status of a transmission control module. In further features, the method further comprises controlling the transmission using the backup transmission control module when the transmission control module is malfunctioning. In still other features, the method further comprises generating a status signal using the engine control module based on the range request signal and a status of a transmission control module. In further features, the method further comprises selectively producing at least one of a visual indicator and an auditory indicator using a driver information center based on the status signal.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
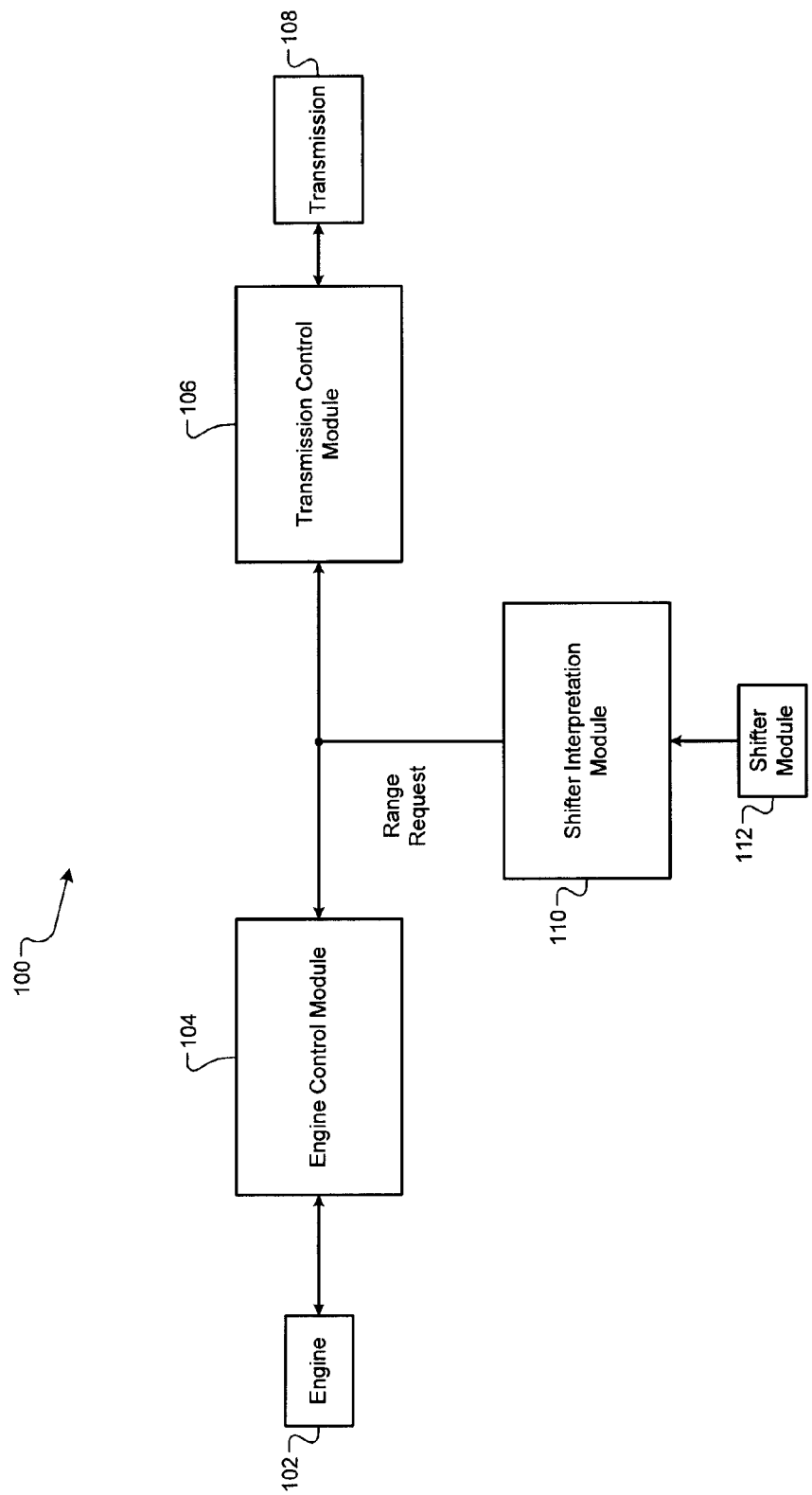
FIG. 1 is a functional block diagram of an electronic transmission range selection system according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Electronic transmission range selection is used in a vehicle to enable a user of the vehicle to select a gear range, such as park, neutral, reverse, drive, low, and overdrive. A shifter module detects actuation of a driver input. An engine control module translates the actuation into a range request. For example, actuation of a lever may be detected by the shifter module. The position of the lever is sent to the engine control module where it is translated into a range request. The engine control module transmits the range request to a transmission control module that controls a transmission based on the range request. Previously, a shifter interpretation module translated the actuation of the driver input into a range request. The shifter interpretation module also transmitted the range request to the transmission.

In the present disclosure, the shifter interpretation module has been eliminated from the system and its functionality incorporated in the engine control module. By doing this, the system may become more reliable because it reduces the number of components that may fail within the system. Also, it may reduce vehicle cost because the shifter interpretation module is not used.

Figure 2:
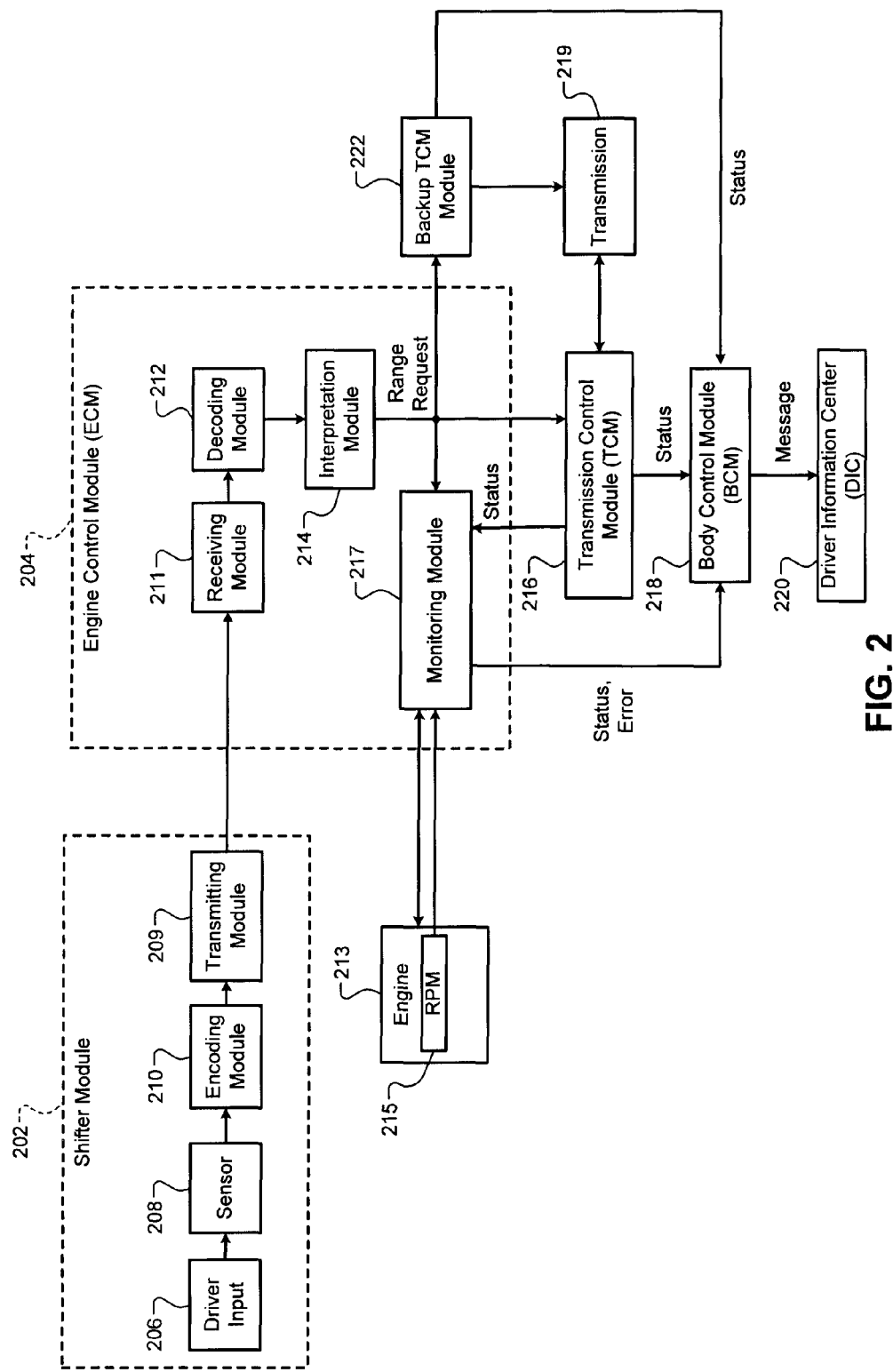
FIG. 2 is a functional block diagram of an exemplary electronic transmission range selection system according to the principles of the present disclosure.

Referring now to FIG. 2, a functional block diagram of an exemplary electronic transmission range selection system according to the principle of the present disclosure is shown. Electronic transmission range selection may be performed by connecting a shifter module 202 directly to an engine control module (ECM) 204 as shown in FIG. 2. In various implementations, the shifter module 202 may be directly connected to the ECM 204, such as via a network, cabling, or wirelessly. For example only, the connection may be made with a network such as a controller area network (CAN) or local interconnect network (LIN).

The shifter module 202 includes a driver input 206 that may include a lever, button, or paddle. The driver input 206 may be used by a driver to select a gear range, such as park, reverse, neutral, drive, low, or overdrive. The shifter module 202 may also include a sensor 208, an encoding module 210, and a transmitting module 209.

The sensor 208 may be used to detect use of the driver input 206. For example, the driver input 206 may include a lever and the sensor 208 may measure an angle of the lever. The output from the sensor 208 may be transmitted to the encoding module 210 which may be located within the shifter module 202.

The encoding module 210 may encode the output from the sensor 208. The encoding module 210 may then transmit an encoded signal to the transmitting module 209. The transmitting module 209 receives the signal from the encoding module 210 and relays the signal to the ECM 204 or, more particularly, to a receiving module 211 that may be located within the ECM 204. The signal is received by the receiving module 211. The receiving module 211 may then transmit the signal to a decoding module 212 where the signal is decoded. The decoded signal is then transmitted to an interpretation module 214. The interpretation module 214 may read, diagnose, and interpret the decoded signal to determine the range request.

There are various methods to encode, decode, and interpret the signals, such as with software or hardware. For example, single edge nibble transmission (SENT) may be used to encode the sensor signal. SENT is a method that uses analog to digital converters and pulse width modulation techniques as an alternative to digital buses. The encoded signal may then be diagnosed and interpreted within the ECM 204. The interpretation module 214 transmits the range request to a transmission control module (TCM) 216, a monitoring module 217, and a backup TCM module 222.

The TCM 216 controls a transmission 219 based on the range request. Both the TCM 216 and the monitoring module 217 may transmit the range request to a body control module (BCM) 218 to be displayed in a driver information center (DIC) 220. This is done by the monitoring module 217 as a backup in cases where a component may not be functioning properly. For example, if the TCM 216 is not functioning properly, the system may continue operating because the requested range is still known by the monitoring module 217.

The monitoring module 217 monitors the range request as well as status signals from vehicle components. For example, an engine 213 may include engine sensors, such as a revolutions per minute (RPM) sensor 215, that the monitoring module 217 monitors. The TCM 216 may also be monitored. If the TCM 216 in working order, then the monitoring module 217 may transmit the range request to the body control module 218. If the TCM 216 is not functioning properly, then the ECM 204 may enter limp home mode.

In limp home mode, the vehicle may be driven until the engine is turned off. For example only, the range request may be used by another controller, such as the ECM 204 or the backup TCM module 222, to control the transmission in case of a failure by the TCM 216. For example, the backup TCM module 222 may control other functions in the vehicle and when the TCM 216 fails, it may receive the range request and control the transmission 219. In various implementations, the functionality of the backup TCM module 222 may be incorporated within the ECM 204.

When the vehicle is in limp home mode, the monitoring module 217 may transmit a message signal to the body control module 218 to be displayed in the DIC 220. The DIC 220 may notify the driver that the vehicle is in limp home mode. After the engine is turned off, the vehicle may not be driven until the TCM 216 is functioning properly or replaced.

If the ECM 204 is not functioning, the system may still be secure. For example, if the driver attempts to start the car when the ECM 204 is not functioning properly, the engine may be unable to turn on. The transmission 219 may rely on hydraulic pressure to shift and may be unable to shift out of park because the engine is not running. If the engine is running when the ECM 204 fails, the engine may immediately shut down, causing the transmission 219 to revert to park.

Figure 3:
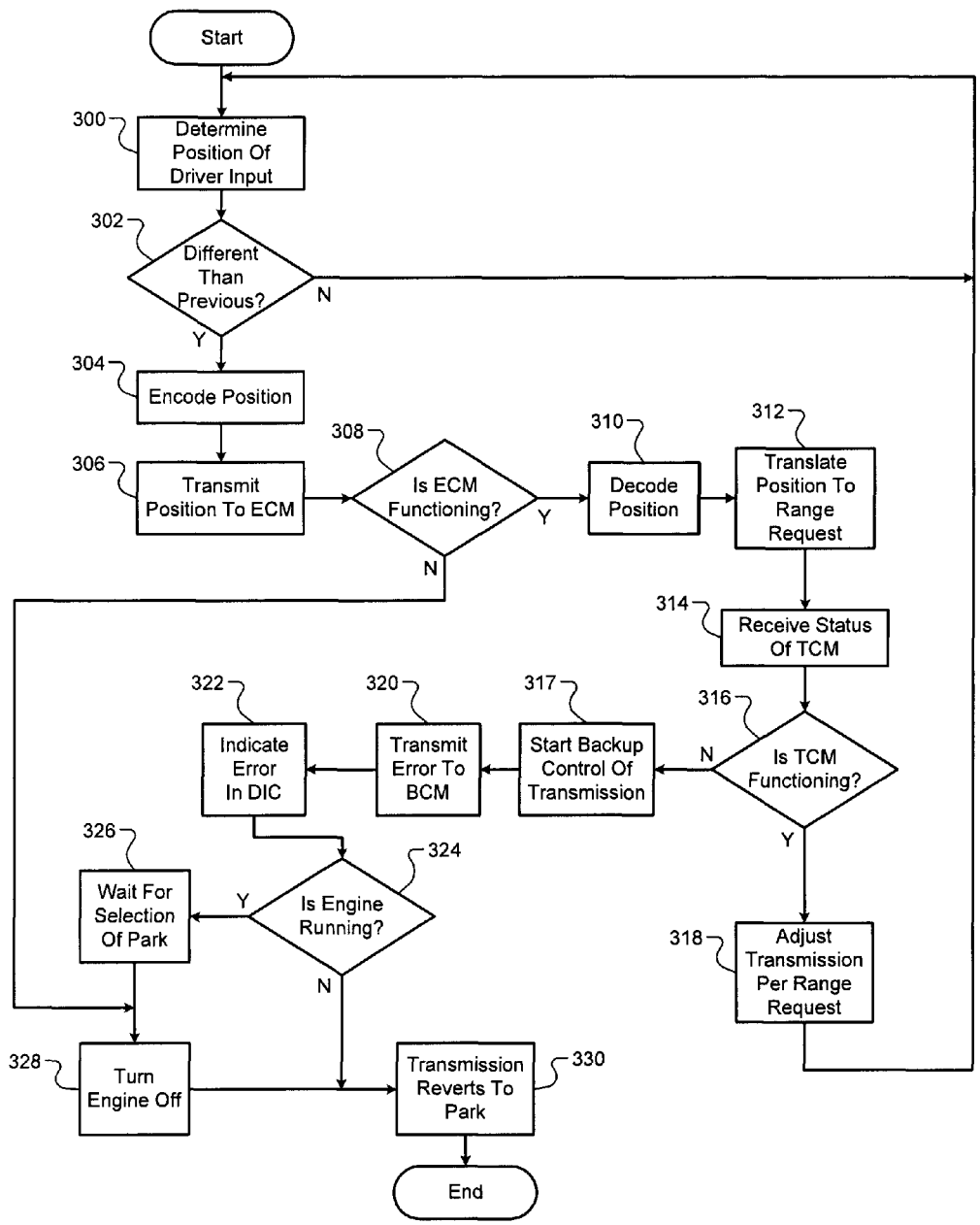
FIG. 3 is a flowchart that depicts exemplary steps performed in range selection based on connecting the shifter module to the ECM according to the principles of the present disclosure.

Referring now to FIG. 3, a flowchart depicts exemplary steps performed in range selection based on connecting a shifter module to the ECM. Control begins in step 300, where the position of the driver input is determined. For example only, the position may be the position of a lever or an actuation of a button or paddle. Control then transfers to step 302, where the current position is compared to the previous position. If it is different, then control transfers to step 304; otherwise, control returns to step 300.

At step 304, the new position is encoded for transmission to the engine control module. Control then transfers to step 306, where the new position is transmitted to the engine control module. The next step is 308, where a determination of the engine control module's functionality is made. If the ECM is functioning, then control transfers to step 310; otherwise, control transfers to step 328. At step 328, the engine is turned off. After step 328, control transfers to step 330, where the transmission reverts to park.

At step 310, the new position is decoded. The decoded signal is then translated to a range request at step 312. Then control transfers to step 314, where the status of the TCM is received. Control then transfers to step 316, where the TCM is checked to determine if it is functioning properly. If the TCM is functioning properly, control transfers to step 318; otherwise, control transfers to steps 317. At step 318, the TCM adjusts the transmission according to the range request. Control then transfers back to step 300.

If the TCM is not functioning properly at step 316, control transfers to step 317, where a backup controller, such as the ECM, takes over control of the transmission. Control then transfers to step 320, where the status and/or error of the TCM is transmitted to the BCM. The next step is 322, where the DIC indicates the status and/or error. Control then transfers to step 324, where a check is made to determine if the engine is running. If it is running, the next step is 326, where control waits for the driver to select park; otherwise, control transfers to step 330 and the transmission reverts to park. After step 326, the engine is turned off at step 328. After step 328, control continues to step 330 and the transmission reverts to park.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system comprising:
   a shifter module that generates a position signal based on a position of a driver input;
   an engine control module that controls an engine, that selects one of a plurality of transmission gear ranges based on a mapping of the position signal to the plurality of transmission gear ranges, and that generates a range request signal based on the selected transmission gear range; and
   a transmission control module that controls a transmission based on the range request signal,
   wherein the engine control module controls the transmission when the transmission control module is malfunctioning.

2. The system of claim 1 wherein the driver input includes a lever and wherein the position signal is based on a position of the lever.

3. The system of claim 2 wherein the position of the lever is based on an angle of the lever.

4. The system of claim 1 wherein the shifter module comprises:
   the driver input;
   a sensor that generates a first signal based upon the position of the driver input;
   an encoding module that encodes the first signal to generate the position signal; and
   a transmitting module that transmits the position signal to the engine control module.

5. The system of claim 4 wherein the engine control module comprises:
   a receiving module that receives the position signal;
   a decoding module that decodes the received position signal; and
   an interpretation module that selects the selected transmission gear range and that generates the range request signal.

6. The system of claim 1 wherein the engine control module generates a status signal based on the range request signal and a status of the transmission control module.

7. The system of claim 6 further comprising a driver information center that selectively produces at least one of a visual indicator and an auditory indicator based on the status signal.

8. A method comprising:
   generating a position signal in a shifter module based on a position of a driver input;
   controlling an engine in an engine control module;
   selecting one of a plurality of transmission gear ranges in the engine control module based on a mapping of the position signal to the plurality of transmission gear ranges;
   generating a range request signal in the engine control module based on the selected transmission gear range;
   selectively controlling a transmission in a transmission control module based on the range request signal; and
   selectively controlling the transmission in the engine control module when the transmission control module is malfunctioning.

9. The method of claim 8 wherein the driver input includes a lever and wherein the position signal is based on a position of the lever.

10. The method of claim 9 wherein the position of the lever is based on an angle of the lever.

11. The method of claim 8 further comprising:
    generating a first signal in the shifter module based on the position of the driver input;
    encoding the first signal in the shifter module;
    generating the position signal in the shifter module based on the encoding; and
    transmitting the position signal to the engine control module.

12. The method of claim 8 further comprising:

receiving the position signal in the engine control module;

decoding the received position signal in the engine control module; and selecting the selected transmission gear range in the engine control module based on the decoding.

13. The method of claim 8 further comprising generating a status signal in the engine control module based on the range request signal and a status of the transmission control module.

14. The method of claim 13 further comprising selectively producing at least one of a visual indicator and an auditory indicator in a driver information center based on the status signal.

15. The system of claim 1 wherein, when the transmission control module is malfunctioning, the engine control module turns the engine off once the selected transmission gear range is park.

16. The system of claim 1 wherein, when the engine control module is malfunctioning, the engine turns off and the transmission reverts to park.

17. The method of claim 8 further comprising, when the transmission control module is malfunctioning, turning the engine off once the selected transmission gear range is park.

18. The method of claim 8 further comprising, when the engine control module is malfunctioning, turning off the engine and controlling the transmission to enter park.

\* \* \* \* \*